(12) United States Patent
Neff

(10) Patent No.: US 8,311,730 B2
(45) Date of Patent: Nov. 13, 2012

(54) VEHICLE POSITION DETERMINATION SYSTEM

(76) Inventor: Ryan A. Neff, Kinnelon, NJ (US)

(*) Notice: Subject to any disclaimer, the term of this patent is extended or adjusted under 35 U.S.C. 154(b) by 1091 days.

(21) Appl. No.: 11/986,760

(22) Filed: Nov. 26, 2007

(65) Prior Publication Data

US 2008/0125972 A1 May 29, 2008

Related U.S. Application Data

(60) Provisional application No. 60/861,626, filed on Nov. 29, 2006.

(51) Int. Cl.
*G05D 1/02* (2006.01)
*G08G 1/16* (2006.01)

(52) U.S. Cl. ............ 701/300; 701/1; 701/117; 701/301

(58) Field of Classification Search .................. None
See application file for complete search history.

(56) References Cited

U.S. PATENT DOCUMENTS

| | | | |
|---|---|---|---|
| 4,361,202 A | 11/1982 | Minovitch | |
| 5,189,619 A | 2/1993 | Adachi et al. | |
| 5,229,941 A | 7/1993 | Hattori | |
| 5,428,544 A | 6/1995 | Shyu | |
| 5,928,294 A | 7/1999 | Zelinkovsky | |
| 5,986,601 A * | 11/1999 | Sugimoto | 342/70 |
| 6,032,097 A | 2/2000 | Lihoshi et al. | |
| 6,151,539 A * | 11/2000 | Bergholz et al. | 701/25 |
| 6,249,232 B1 | 6/2001 | Tamura et al. | |
| 6,268,803 B1 * | 7/2001 | Gunderson et al. | 340/903 |
| 6,292,725 B1 | 9/2001 | Kageyama et al. | |
| 6,370,475 B1 * | 4/2002 | Breed et al. | 701/301 |
| 6,405,132 B1 * | 6/2002 | Breed et al. | 701/301 |
| 6,615,137 B2 | 9/2003 | Lutter et al. | |
| 6,650,252 B2 | 11/2003 | Miller, Jr. | |
| 6,681,157 B2 | 1/2004 | Kageyama | |
| 6,768,944 B2 * | 7/2004 | Breed et al. | 701/301 |
| 7,382,274 B1 | 6/2008 | Kermani et al. | |
| 7,383,121 B2 | 6/2008 | Shinada | |
| 7,418,346 B2 * | 8/2008 | Breed et al. | 701/301 |
| 7,617,041 B2 | 11/2009 | Sera | |
| 2003/0009275 A1 * | 1/2003 | Koike | 701/93 |
| 2004/0024498 A1 * | 2/2004 | Okamura et al. | 701/1 |
| 2005/0060069 A1 * | 3/2005 | Breed et al. | 701/29 |
| 2005/0073433 A1 * | 4/2005 | Gunderson et al. | 340/903 |
| 2005/0084156 A1 * | 4/2005 | Das et al. | 382/224 |
| 2005/0131646 A1 * | 6/2005 | Camus | 701/301 |
| 2005/0134440 A1 * | 6/2005 | Breed | 340/435 |
| 2005/0137786 A1 * | 6/2005 | Breed et al. | 701/200 |
| 2005/0195383 A1 | 9/2005 | Breed et al. | |
| 2005/0232463 A1 * | 10/2005 | Hirvonen et al. | 382/103 |
| 2005/0232491 A1 * | 10/2005 | Chang et al. | 382/199 |
| 2007/0135989 A1 | 6/2007 | Hengst | |

OTHER PUBLICATIONS

Office Action Mailed Mar. 28, 2012 in U.S. Appl. No. 11/986,711.

* cited by examiner

*Primary Examiner* — Ian Jen

(57) ABSTRACT

A vehicle position determination system can determine a position of a first moving vehicle relative to at least one other moving vehicle and to non-moving objects. An information communication system transported by a first moving vehicle can be operable to receive from the at least one other moving vehicle an estimate of such moving vehicle's position relative to the first moving vehicle. Sensors of the first moving vehicle can be usable to obtain information relating to positions of other moving vehicles and non-moving objects in a vicinity of the first moving vehicle. A processor may then use the obtained information with the received estimate of the at least one other moving vehicle's position to make a first estimate of a position of the first moving vehicle relative to the other moving vehicles and non-moving objects.

8 Claims, 8 Drawing Sheets

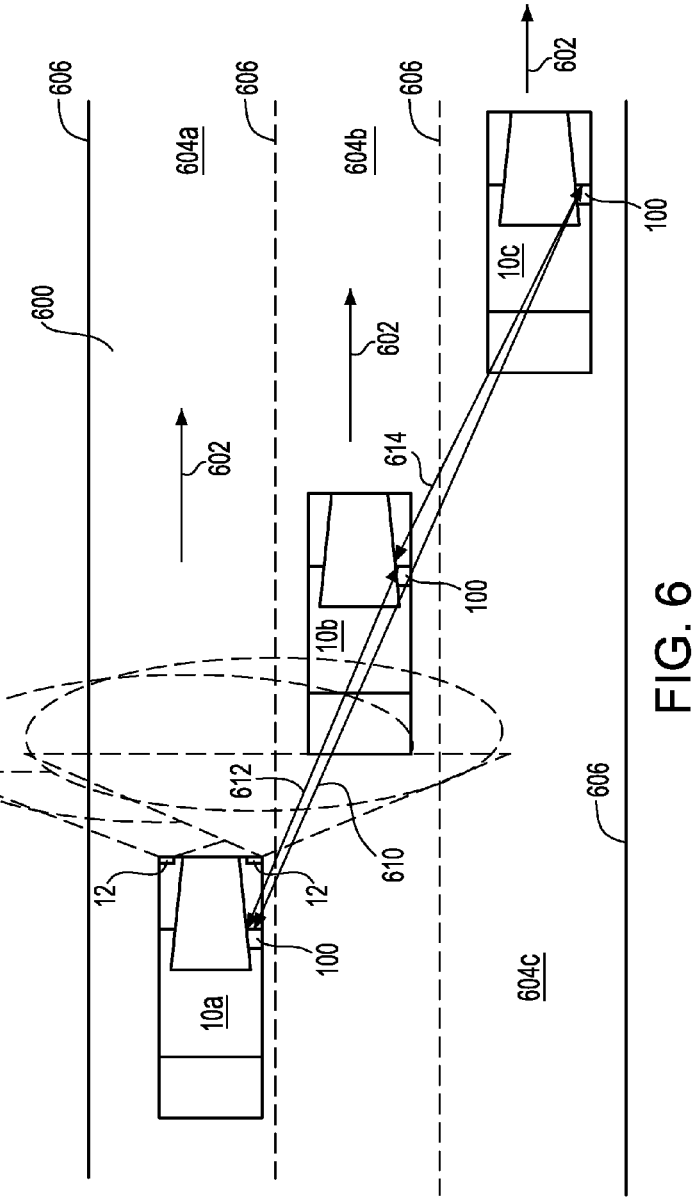

VEHICLE POSITION DETERMINATION SYSTEM

CROSS-REFERENCE TO RELATED APPLICATION

The present application claims the benefit of the filing date of U.S. Provisional Application No. 60/861,626 filed Nov. 29, 2006, the disclosure of which is hereby incorporated herein by reference. This application is being filed on even date with the application entitled "Driverless Vehicle" of Ryan A. Neff, which also claims the benefit of said United States Provisional Application.

BACKGROUND OF THE INVENTION

Aspects of the present invention relate to systems and methods for automatically controlling the direction and speed of movement of a vehicle, such as on a roadway. Further aspects of the invention relate to systems and methods for determining the position of a moving vehicle relative to other moving vehicles and non-moving objects, such as on a roadway.

The development of an automobile or other motor vehicle that can maneuver itself safely on a public roadway without a human operator is a goal that has been sought for a very long time, perhaps from the time of the automobile's very invention. Many other forms of transportation already include self-piloting mechanisms, such as airplanes, ships and a few light rail systems found in airports. Progress demands that the tiresome chore of driving give way to leisurely rides in cars that drive themselves. Popular science fiction, periodicals, television, and movies describe future worlds where automobiles, trucks, buses and other motorized vehicles are fully automated, ferrying passengers from point to point over public roadways, all without the aid of a human operator. However, many obstacles remain before the goal can be attained. Achieving the goal requires a man-made system to autonomously perform that which previously required a combination of complex human perception, reliable judgment and action.

One part of the challenge is to develop a system which reliably determines the position of a moving vehicle with respect to other moving vehicles. Such system must also reliably determine the position of the moving vehicle with respect to the changing contour of the roadway, e.g., the shifting positions of the roadway's boundaries and lane markings. One known system for determining a vehicle's position is a global positioning satellite ("GPS") receiver. A GPS receiver, by simultaneously receiving signals from several space satellites orbiting the earth, can determine one's position anywhere on the earth. By analyzing measurements taken over a period of time, a GPS receiver can also estimate one's speed. The GPS system has both civilian and military aspects. Military GPS receivers receive special military-only GPS signals to guide objects with the highest precision. Civilian GPS receivers are less precise. At best, civilian GPS receivers have measurement errors of several feet or more, certainly too great to rely on individual GPS receivers alone to prevent vehicles in adjacent lanes of a roadway from colliding.

As described in U.S. Pat. No. 4,486,694, one way of guiding a driverless vehicle involves "detecting a magnetic field generated by a guide path, such as a conductor wire energized by a high frequency current." (col. 1, lns. 15-17). One or more energized linearly extending conductive guide wires are required to run the entire length of the route. It is apparent that such guiding method is not suitable for widespread implementation. Providing energized guide wires involves formidable expense and requires a long-term undertaking to retrofit even a minority of the most heavily trafficked roads. The costs and logistics of adding energized wires to roads makes it likely that only a few roads would ever be so equipped. Systems that require energized guide paths to function lead to a technological dead end. Such systems do not provide a migration path to future driverless vehicle systems because they are not compatible with existing roadways and their use by today's human-operated vehicles.

SUMMARY OF THE INVENTION

A vehicle position determining system in accordance with an aspect of the invention is operable to determine a position of a first moving vehicle relative to at least one other moving vehicle and to non-moving objects. In such system, an information communication system being transported by a first moving vehicle can be operable to receive from the at least one other moving vehicle an estimate of a position of the at least one other moving vehicle in relation to the first moving vehicle. A position determining system being transported by the first moving vehicle can have (i) a plurality of sensors operable to obtain information relating to positions of other moving vehicles and non-moving objects in a vicinity of the first moving vehicle. In addition, the position determining system may have (ii) a processor operable to determine a first estimate of a position of the first moving vehicle in relation to the other moving vehicles and non-moving objects. The estimate can be determined, for example, from the information obtained by the plurality of sensors and from the received estimate of the position of the at least one other moving vehicle.

In accordance with a particular aspect of the invention, the information can be obtained via rays reflected off of the other moving vehicles and non-moving objects. In a particular aspect of the invention, the processor may be operable to determine a sensed position of the first moving vehicle relative to the other moving vehicles and non-moving vehicles from the information obtained by the plurality of sensors. Such processor may be operable to determine the first estimate from the sensed position and the received estimate of the position of the at least one other moving vehicle.

In accordance with a particular aspect of the invention, the information communication system may be operable to receive estimates of positions of the other moving vehicles via vehicle position determining systems which are transported by the other moving vehicles.

In accordance with a particular aspect, the estimates of the positions of the other moving vehicles are determined at least in part by sensors included in the vehicle position determining systems transported by the other moving vehicles.

In accordance with a particular aspect of the invention, at least one of the estimates of the positions of the other moving vehicles may be received at least once by a second vehicle of the other moving vehicles, and may be received by the first moving vehicle after retransmission by the second vehicle.

In accordance with a particular aspect of the invention, the position determining system of the first moving vehicle may be operable to construct a view of a coordinate space over which the first moving vehicle is moving at a particular point in time. Such position determining system may be operable to calibrate the view of the coordinate space using the received estimate of the position of the at least one other moving vehicle.

In accordance with an aspect of the invention, a system is provided for automatically controlling the velocities of a plurality of vehicles on a roadway. Such system may include a plurality of vehicle navigation systems, each being transported by a respective vehicle of the plurality of vehicles. Each vehicle navigation system transported by each respective vehicle may include: a position determining system operable to determine and record a position and a velocity of the respective vehicle with respect to points in a coordinate space and with respect to a common time reference. An information acquisition system may also be included which is operable to determine a displacement between the respective vehicle and at least one vehicle adjacent to the respective vehicle and determine a velocity of the at least one adjacent vehicle. An information communication system can be operable to transmit first information from the respective vehicle to other vehicles of the plurality of vehicles. For example, the first information may include the position and velocity of the respective vehicle. The information communication system may also be operable to receive second information from the other vehicles, including positions and velocities of the other vehicles.

A vehicle routing system further included in the vehicle navigation system can be operable to determine a target routing of the respective vehicle between a given location and a destination over a path including the roadway and to determine a target velocity for moving the respective vehicle over the roadway. A vehicle velocity control system may be operable to control the velocity of the respective vehicle based on the target routing, the target velocity, and the position and velocity of the respective vehicle, the displacement between the respective vehicle and the at least one adjacent vehicle, the velocity of the at least one adjacent vehicle, and the second information indicating the positions of the other vehicles and the velocities of the other vehicles.

In accordance with a particular aspect of the invention, the system can be operable to control the velocities including speed and direction of movement of the plurality of vehicles without requiring the plurality of vehicles to be driven by human operators.

In accordance with a particular aspect of the invention, the information acquisition system is operable to detect a hazard on the roadway and to measure displacement of the respective vehicle from the detected hazard. The vehicle velocity control system of the respective vehicle may then be operable to control the velocity of the respective vehicle based further on the displacement of the respective vehicle from the detected hazard.

In accordance with a particular aspect of the invention, the vehicle velocity control system may be operable to determine an estimate a velocity of traffic on the roadway based on the received second information.

In accordance with a particular aspect of the invention, the position determining system of the respective vehicle may operable to use the received second information in determining the position and velocity of the respective vehicle.

In accordance with a particular aspect of the invention, the information acquisition system may be operable to determine a boundary of the roadway.

In accordance with a particular aspect of the invention, the information acquisition system is operable further to detect impaired traction between the respective vehicle and a surface of the roadway and the first information transmitted by the information acquisition system may include information relating to the detected impaired traction.

In accordance with a particular aspect of the invention, the second information received by the information communication system may include information relating to impaired traction detected between at least one of the other vehicles and the surface of the roadway. The vehicle velocity control system may be operable to control the velocity of the respective vehicle based further on the information relating to the impaired traction of the at least one other vehicle.

In accordance with a particular aspect of the invention, the server information processing device may be operable to retransmit the second information received from the at least one other vehicle to a third vehicle of the plurality of vehicles for reception by the information communication system included in the third vehicle.

In accordance with a particular aspect of the invention, the vehicle velocity control system may be operable to a) assign a first weight to the velocity of a first one of the other vehicles near the respective vehicle, b) assign a second weight to the velocity of a second one of the other vehicles farther away from the respective vehicle than the first vehicle, the second weight being lower than the first weight, and c) control the velocity of the respective vehicle based on the weighted velocities of the first and second vehicles.

In accordance with a particular aspect of the invention, the vehicle navigation system may be operable to detect presence of a non-communicating vehicle proximate to the respective vehicle with which the information communication system is not in communication. The vehicle velocity control system may be operable to control the velocity of the respective vehicle so as to maintain a greater displacement between the respective vehicle and the non-communicating vehicle than a minimum displacement permitted between the respective vehicle and any of the other vehicles.

In accordance with a particular aspect of the invention, the vehicle velocity control system can include a mechanism for steering the respective vehicle without requiring an action of a human driver.

In accordance with a particular aspect of the invention, the vehicle velocity control system can include a mechanism for accelerating the respective vehicle without requiring an action of a human driver.

In accordance with a particular aspect of the invention, the vehicle velocity control system can include a mechanism for decelerating the respective vehicle without requiring an action of a human driver.

BRIEF DESCRIPTION OF THE DRAWINGS

FIG. 5 is a diagram illustrating information fields of an information signal communicated between communication systems of autonomous piloting systems of respective vehicles in accordance with an embodiment of the invention.

FIG. 6 is a diagram illustrating operation of an autonomously piloted vehicle on a roadway in accordance with an embodiment of the invention.

DETAILED DESCRIPTION

In accordance with the embodiments of the invention described below, a system and method is provided for determining the position of moving vehicle, e.g., an automobile, truck, bus, or other vehicle on a roadway with respect to other moving vehicles and non-moving objects. In addition, a vehicle-mounted system and method enable a vehicle to autonomously control a speed and direction of movement of the vehicle, thereby eliminating the need for a human operator.

Figure 1:
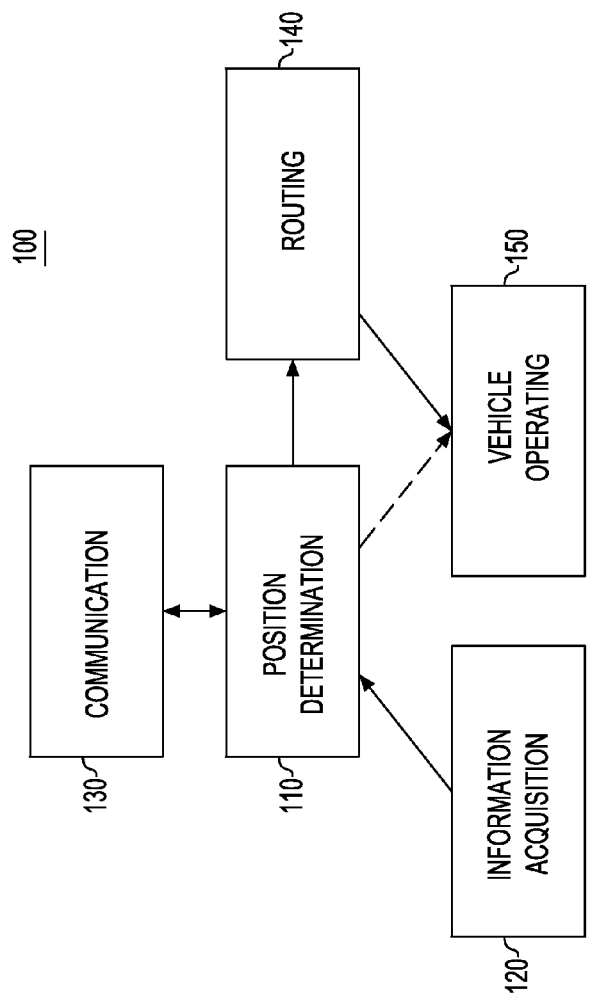
FIG. 1 is a block diagram illustrating a functional organization of an autonomous vehicle piloting system in accordance with an embodiment of the invention.

FIG. 1 represents components of an autonomous piloting system 100 for a vehicle in accordance with an embodiment of the invention. As illustrated therein, the autonomous piloting system includes a position determination system 110 which is used to determine the position of the vehicle with respect to the boundaries, e.g., edges and shoulders of the roadway, and the position of the vehicle in relation to other vehicles and non-moving objects, e.g., barriers, tollgates, traffic cones, potholes and the like which may appear on the roadway. Desirably, the position determination system 110 functions to estimate a position of the vehicle in relation to universal coordinates, e.g., latitude and longitude coordinates. Desirably, the position determination system 110 estimates the position of the vehicle in relation to a coordinate space which is calibrated to appear the same to all vehicles which are traveling on the roadway at the time.

The position determination system 110 utilizes information obtained by an information acquisition system 120 on the vehicle to form an estimate of the vehicle's position. Using a plurality of sensors on the vehicle, the information acquisition system acquires information from which the vehicle's position can be determined in relation to boundaries of the roadway, e.g., relative to one or more of its edges, shoulders, and lane markings. Using the sensors, the information acquisition system 120 also obtains information from which the position of the vehicle can be determined in relation to other vehicles on and adjacent to the roadway, the other vehicles being either moving or non-moving, e.g., stopped. In addition, using the sensors, information is obtained from which distances can be determined between the vehicle and non-moving objects, e.g., barriers, tollgates, traffic cones and road hazards such as debris and potholes.

The sensors of the vehicle can include one or more types of devices. Among examples of such sensors are electronic imaging devices such as microelectronic camera devices, such as for example, charge-coupled devices ("CCDs") which respond to light at infrared, visible or ultraviolet wavelengths or light or which respond to light at a combination of two or more of infrared, visible or ultraviolet wavelengths. Other examples of sensors are devices which determine relative distances and velocities between vehicles, such as laser, radar, sonic and ultrasonic devices. Such devices typically are paired with transmitters which transmit corresponding laser, radar, sonic or ultrasonic signals for reflection from surfaces of other vehicles and objects.

Each type of sensor has certain advantages and disadvantages. Laser sensors are capable of determining displacement and relative velocity between vehicles fairly accurately, but are hampered both by bright illumination and poor visibility conditions. Sonic and ultrasonic sensors work best where displacement and relative velocity between the vehicle and the object being sensed are small. Radar sensors utilize Doppler effects to determine relative velocity; radar sensors typically do not accurately estimate displacement between vehicles which are traveling at the same or nearly the same velocity.

Stereoscopic imaging information can be obtained when a plurality of imaging devices such as for example, electronic cameras capture images of the same object from two related but distinct vantage points. Stereoscopic imaging information can be used to estimate a distance between the two or more distinct vantage points and the object captured in the two or more images. In one embodiment illustrated in FIG. 2A, a vehicle 10 has a plurality of outwardly-facing exterior panels such as fenders, doors, grills, trunk lids, bumpers, etc., on which electronic cameras 12 are mounted for capturing images of objects and vehicles in their respective fields of view. At least two electronic cameras 12 are mounted to each face of the vehicle for obtaining images from corresponding points of view of, the faces including a front (forward-facing) face 14, a back (rearward-facing) face 16, a left side (port-looking) face 18, and a right side (starboard-looking) face 19 of the vehicle, the nautical terms being given analogous meanings, where the front end of the vehicle occupies a position similar to the bow of a vessel. The fields of view of each electronic camera 12 extend in directions indicated by cones 40 from the points of the vehicle at which each camera 12 is mounted to the vehicle.

Figure 2A:
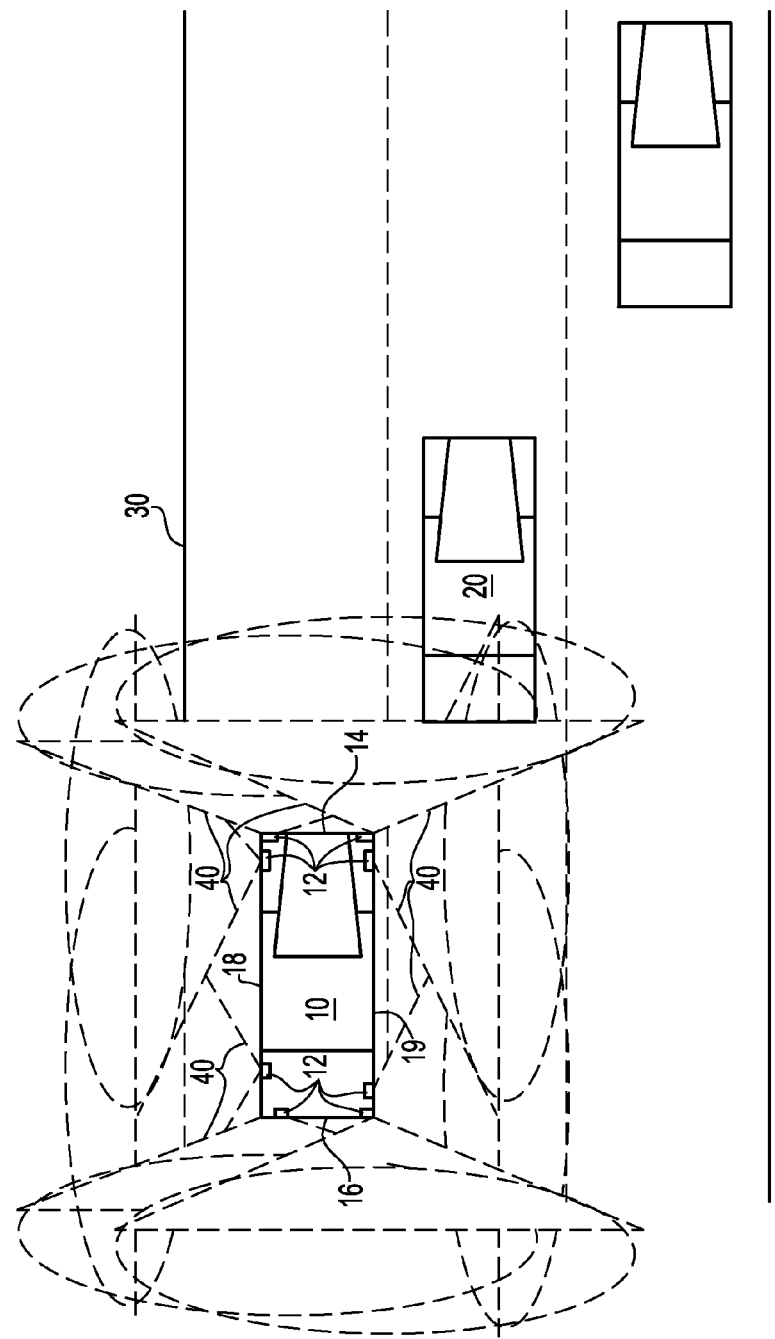
FIG. 2A is a top-down plan view illustrating placement and function of sensors on a vehicle in accordance with an embodiment of the invention.

As illustrated in FIG. 2A, each of the sets of two or more electronic cameras 12 on each face of the vehicle 10 obtain image information from their respective vantage points which the position determination system 110 (FIG. 1) can use to determine the presence of an object such as another vehicle 20 or an edge 30 of the roadway in the respective fields of view of the cameras 12. From such information, the position determination system 110 can also estimate the distance and apparent relative velocity between such face of the vehicle and the object, e.g., another vehicle 20 or road edge 30 captured in the images.

Figure 2B:
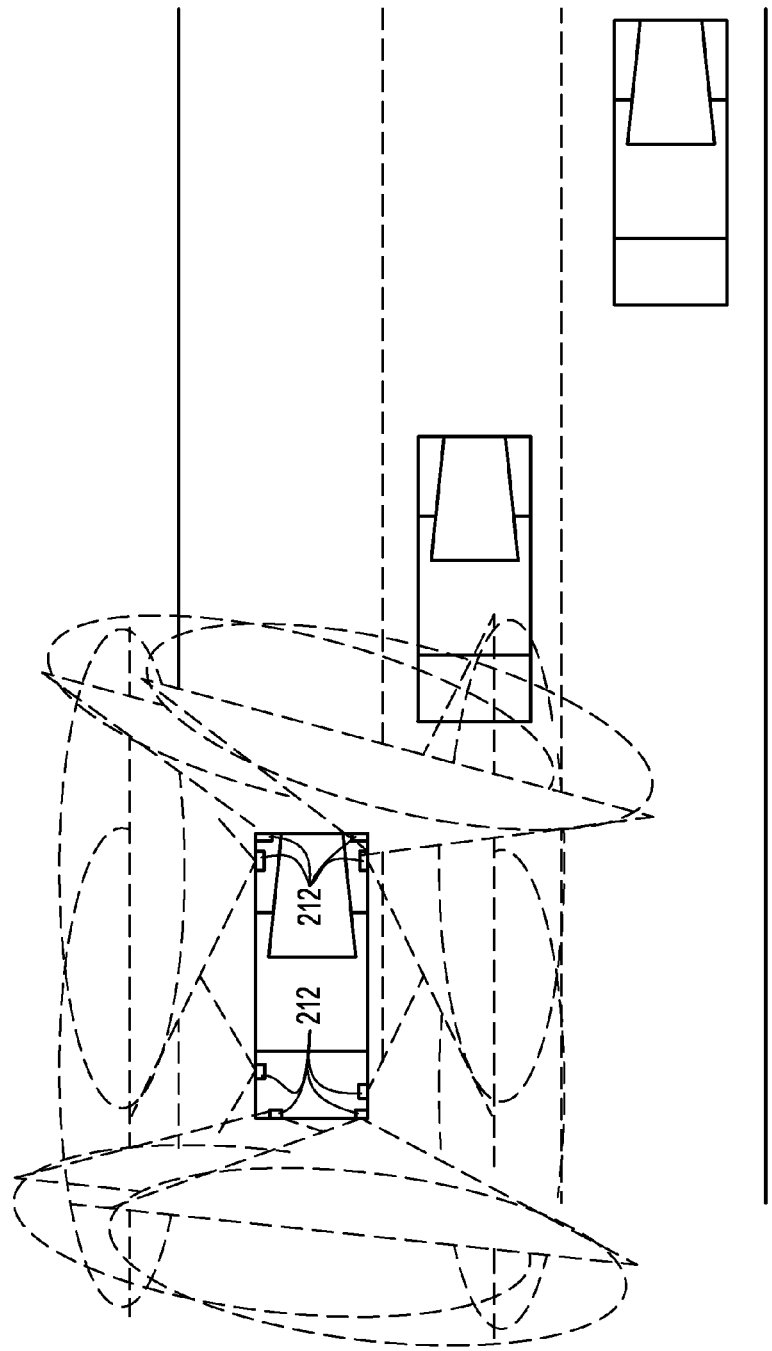
FIG. 2B is a top-down plan view illustrating placement and function of sensors on a vehicle in accordance with a variation of the embodiment of the invention illustrated in FIG. 2A.

FIG. 2B illustrates a variation of the embodiment shown in FIG. 2A in which the sensors 212, e.g., stereoscopic cameras, etc., are capable of being moved in relation to their mounts on the vehicle. Thus, sensors 212 can be panned, tilted or both in order to scan for other vehicles or objects on the roadway, potentially providing a wider field of vision for the vehicle than would be possible otherwise.

Figure 2C:
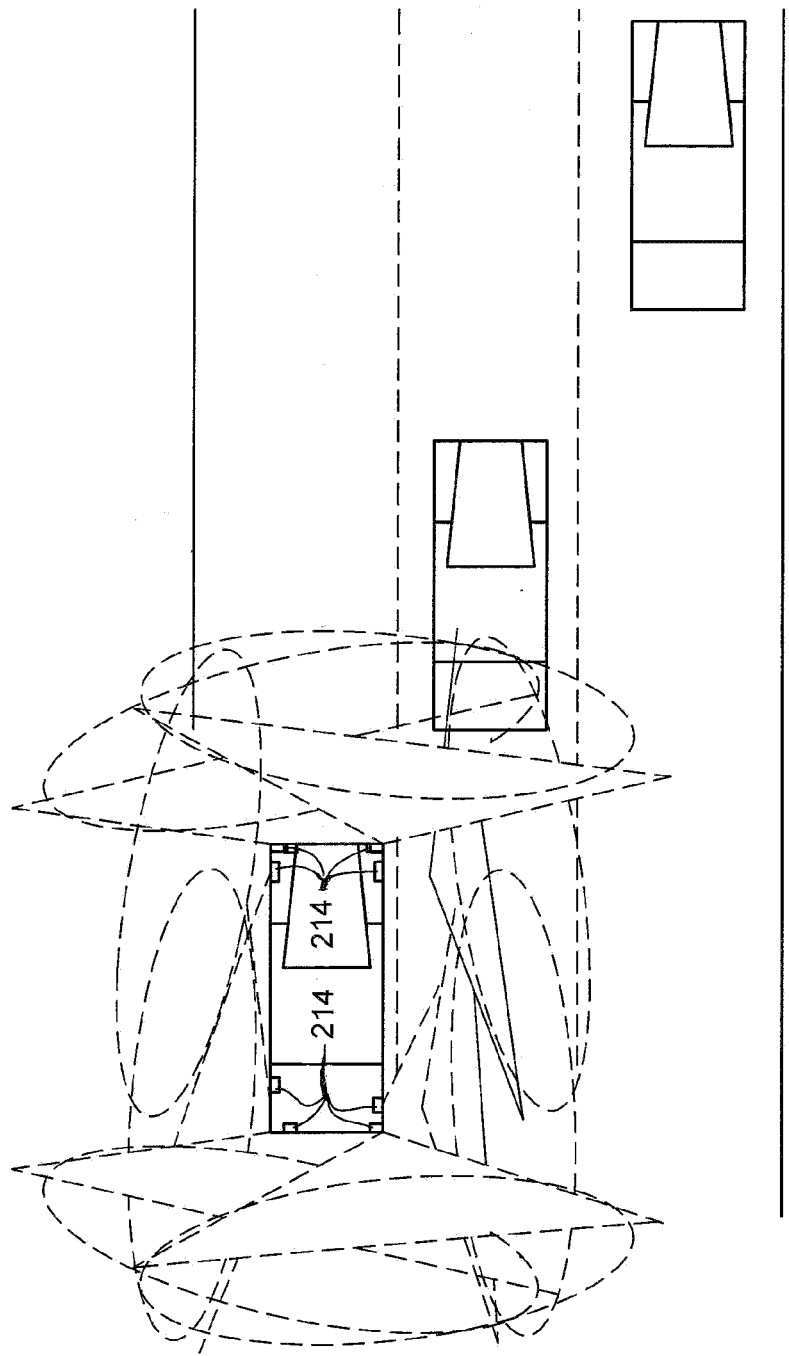
FIG. 2C is a top-down plan view illustrating placement and function of sensors on a vehicle in accordance with a further variation of the embodiment of the invention illustrated in FIG. 2A.

FIG. 2C illustrates a further variation of the embodiment shown in FIG. 2B in which each of the sensors 214 such as, for example, stereoscopic cameras, etc., can be moved independently in relation to its mounts on the vehicle. In this case, with each sensor capable of being panned or tilted independently from another sensor on the same face of the vehicle, additional hardware or software control provided in the vehicle's position determination system 110 (FIG. 2) is used to resolve stereoscopic aspects of images such that depth of perception is still achieved despite the independent movement of the sensors.

In addition to obtaining the above type of information from sensors, the information acquisition system 120 preferably also indicates information regarding the vehicle's position relative to universal coordinates, such information being obtained, for example, from a GPS (global positioning satellite) receiver. The information acquisition system 120 may obtain a series of GPS estimates of the vehicle's position with respect to universal coordinates over a period of time. Between times at which such GPS estimates are determined, the information acquisition system may utilize information obtained by a speed sensor or odometer on the vehicle to estimate the vehicle's position at any given point in time.

Referring again to FIG. 1, the autonomous piloting system includes a communication system 130 installed in or on the vehicle. The communication system 130 is used to receive information from other vehicles on the roadway, from transmission sources associated with the roadway or both. The information received by the communication system 130 from other vehicles on the roadway may include estimates of the positions of the other vehicles obtained by position determination systems 110 of like piloting systems 100 installed in the other vehicles. Alternatively or in addition thereto, the information received through the vehicle's communication system 130 from other vehicles may include information such as obtained by information acquisition systems 120 of similar piloting systems 100 of other vehicles. In such case, the received information may include sensor-acquired information of the type usable by position determination systems 110 of such other vehicles for determining distances between those other vehicles and the one vehicle. In another example, the received information may include information of the type which is usable to determine distances between those other vehicles and things, such as the roadway's boundaries, other vehicles, objects, etc.

Using the information obtained by the vehicle's own information acquisition system 120 and the information obtained through the communication system 130 from the other vehicles, the position determination system 110 can estimate of the vehicle's position relative to the coordinate space. Such estimates can be even more accurate than that which the position determination system 110 acquires by reference to information that may be obtained solely through the vehicle's own information acquisition system 120. Also, using such information the position determination system 110 is able to make sufficiently correct estimates of the vehicle's position relative to the boundaries of the roadway and relative to other vehicles and the roadway and objects.

The maximum tolerable error in the estimate made of the vehicle's position by the position determination system can vary. Error results from the combined effects of inaccuracy and imprecision in making an estimate. As used herein, the term "accuracy" refers to the correctness of the estimate considering the contribution of error. The term "precision" refers to the specificity of the estimate, which can vary with the method used to determine the estimate. Both accuracy and imprecision add to error. When a measurement is subject to ±5% inaccuracy and ±5% imprecision, the measurement is subject to ±10% error.

Distances between the vehicle and other vehicles in the longitudinal direction (lengthwise) direction of the roadway can tolerate error of many feet when vehicles are separated by fairly large distances. On the other hand, when the distance between the one vehicle and another vehicle is close, such as when the one vehicle is passing the other or is about to pass the other, the maximum tolerable error is much smaller. The maximum tolerable error may be best expressed as a percentage of the distance between vehicles and the minimum separation that must be maintained between them, in either longitudinal or lateral directions of the roadway. For example, when two moving vehicles are positioned one in front of the other in the longitudinal direction of the roadway at an estimated separation of 100 feet, the maximum tolerable error of the position estimate can be 10 or 20 feet. At the estimated vehicle-to-vehicle separation distance, the maximum tolerable error equates to about 10% to 20% of the estimated distance separating the two vehicles. In another example, when two moving vehicles are about to pass in adjacent lanes of the roadway, or they are traveling side-by-side in adjacent lanes, the maximum tolerable error may be 0.5 feet to 1.0 foot (6 inches to one foot) where the estimated separation distance between the adjacent sides of the vehicles is five feet. Again, in this example, maximum tolerable error is about 10% to 20% of the estimated vehicle-to-vehicle separation distance.

In addition to being able to determine the position of the vehicle at any given point in time, the position determination system 110 is also able to make sufficiently reliable estimates of the position of the vehicle at future points in time. These estimates of future position can be based, for example, on the vehicle's present position plus a change in the vehicle's position obtained, for example, by integrating the vehicle's velocity over one or more units of time. For purposes of these estimates, when the vehicle's current velocity is steady, the vehicle's future velocity can be assumed to remain constant at the vehicle's current velocity.

However, when the vehicle's velocity is currently changing, estimating the vehicle's position at the future point in time involves somewhat more complexity. First, in a typical case where acceleration is not constant, a function describing the vehicle's current acceleration can be determined by twice differentiating the distance that the vehicle has traveled during each of several successive constant time intervals leading up to the current point in time. From this function, the rate of change in the acceleration over the successive time intervals can be determined. From that determination, extrapolation can be used to determine a function describing the vehicle's future acceleration up until the vehicle is predicted to reach constant velocity. During high-speed travel, such as highway travel, the vehicle may be predicted to reach constant velocity gradually or in a manner that is similar to an asymptotic approach. During travel along more congested or lower speed roads, the vehicle may be predicted to reach constant velocity more abruptly due to the rapidity of the vehicle's acceleration relative to the speed limit of such road. When the vehicle reaches constant velocity, the vehicle's acceleration is predicted to remain essentially at zero. By double integrating the function that predicts the vehicle's future acceleration with respect to time, the vehicle's position at each of several future points in time can be predicted.

By a similar process, information regarding the positions of other vehicles on the roadway, obtained by the one vehicle's information acquisition system 120, received through its communication system 130, or both can be used by the position determination system 110 of the one vehicle. Through such information, each vehicle can determine functions describing the current and expected future velocities and accelerations of other nearby vehicles. By integrating such functions, the position determination system of each vehicle can keep track of the past, current and predicted future positions of other vehicles in relation to such vehicle.

The number of points in time required to estimate the vehicle's position and for what length of time future position estimates are required can vary. On a roadway with little traffic, excellent road conditions and excellent visibility, only a few estimates of the vehicle's future position may need to be made. On a roadway with heavy traffic, poor road conditions or poor visibility, more estimates made need to be made, which may be more tightly packed in time, may stretch farther into the future or both. Here, the term "poor visibility" can be from the perspective of the sensors of the vehicle which are used to acquire information for making position estimates.

Using estimates of the vehicle's current position and estimates of the vehicle's future position obtained by the position determination system 110 (FIG. 1), a vehicle routing system 140 determines a heading and velocity at which to operate the vehicle at the current point in time. Preferably, the vehicle routing system 140 also determines headings and velocities at which to operate the vehicle at future points in time. The current heading is based upon information concerning a desired destination or a waypoint on a path to a destination, as inputted to the routing system prior thereto.

Figure 3:
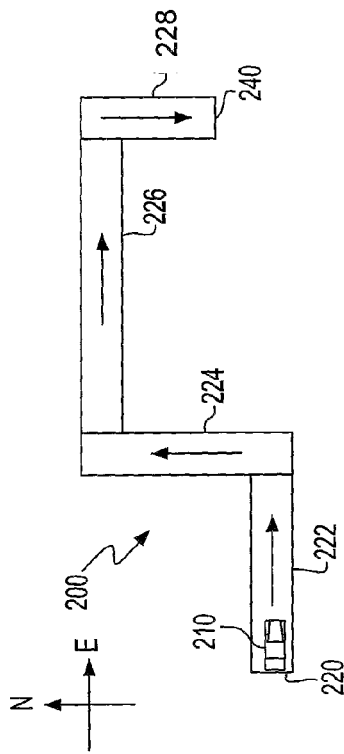
FIG. 3 is a diagram illustrating a path for routing a vehicle from a starting point to a destination by a routing system of an autonomous piloting system in accordance with an embodiment of the invention.

A path for routing a vehicle on one or more roadways between a starting position to a destination can be determined, for example, by relating the vehicle's starting position in the coordinate space to database information regarding the relevant roadways between the starting position and the destination. For example, FIG. 3 depicts a path 200 and path segments 222, 224, 226, and 228 thereof for operating a vehicle 210 between a starting point or origin 220 and a destination 240. Once a path 200 in the coordinate space has been determined and the vehicle's position relative to the path have been determined, the routing system 140 can predict the times at which changes in the vehicle's heading and velocity need to be made. The routing system 140 can also refer to database Information concerning the nature of the junctions between each path segment, such as presence or absence of traffic signals, need for left or right turns, and the approximate radii of the turns needed, to help determine the velocity at which the junctions need to be approached and successfully negotiated. The database information may be obtained through a local database of read only information or updateable information kept permanently in the vehicle or both, or the database information may be obtained from a database external to the vehicle such as through wireless transmission. In the latter case, portions of the database information which relate to the vehicle's current path and current location can be cached locally in storage accessible to the autonomous piloting system 100 of the vehicle.

The vehicle operating system 150 depicted in FIG. 1 receives control input from the routing system 140 for operating the vehicle according to a current heading and velocity. Using this control input, the vehicle operating system 150 controls the speed and the direction of movement of vehicle. The vehicle operating system 150 responds to control signals provided by the routing system 140 to speed up the vehicle, slow it down, or maintain the vehicle's current velocity. The vehicle operating system 150 also steers the vehicle through turns, merges and other maneuvers and is responsible to maintain the vehicle's current position relative to boundaries, e.g., edges of the road or lane boundaries. The vehicle operating system 150 may include one or more inertial sensors such as accelerometers, gyroscopes and the like for directly sensing the attitude, acceleration, direction of movement and other characteristics of the vehicle's movement. In another example, the vehicle operating system may receive information regarding the vehicle's acceleration, velocity, position, etc. from the position determination system 110. In a third example, the vehicle operating system may utilize such information received from the position determination system 110 and information regarding other movement characteristics that the vehicle senses using an inertial sensor or other sensor.

In addition to the controlling the vehicle's operation in accordance with the routing information, the vehicle operating system 150 may also receive information output directly from the position determination system 110. In certain instances, the position determination system 110 may determine that an immediate vehicle response is required. For example, assume that the one vehicle has right of way at an intersection between two roadways and is executing maneuvers to negotiate the intersection at a correct time and an appropriate speed. The position determination system 110 determines that the behavior of another vehicle at the intersection is not as predicted, such as when the other vehicle fails to yield when required. In order to avoid an imminent collision with another vehicle at an intersection between two roadways, the position determination system of the one vehicle may determine that the best way to avoid the imminent collision is to apply the brakes to slow down the one vehicle. In that case, the position determination system may directly provide control information to the vehicle operating system to immediately apply the brakes, possibly temporarily overriding other information provided to the vehicle operating system by the routing system 140.

In another example, the position determination system 110 may determine that the one vehicle should accelerate to avoid collision with the other vehicle. In that case, the position determination system may directly provide control information to the vehicle operating system 150 to temporarily increase the throttle and cause the vehicle to accelerate, overriding the control information provided thereto by the routing system 140, if necessary. In another example, the position determination system 110 may determine that the vehicle needs to steer away to avoid collision, and in such case provide control information causing the vehicle operating system to temporarily veer from a current heading, again overriding control information provided thereto by the routing system 140, if necessary.

Figure 4:
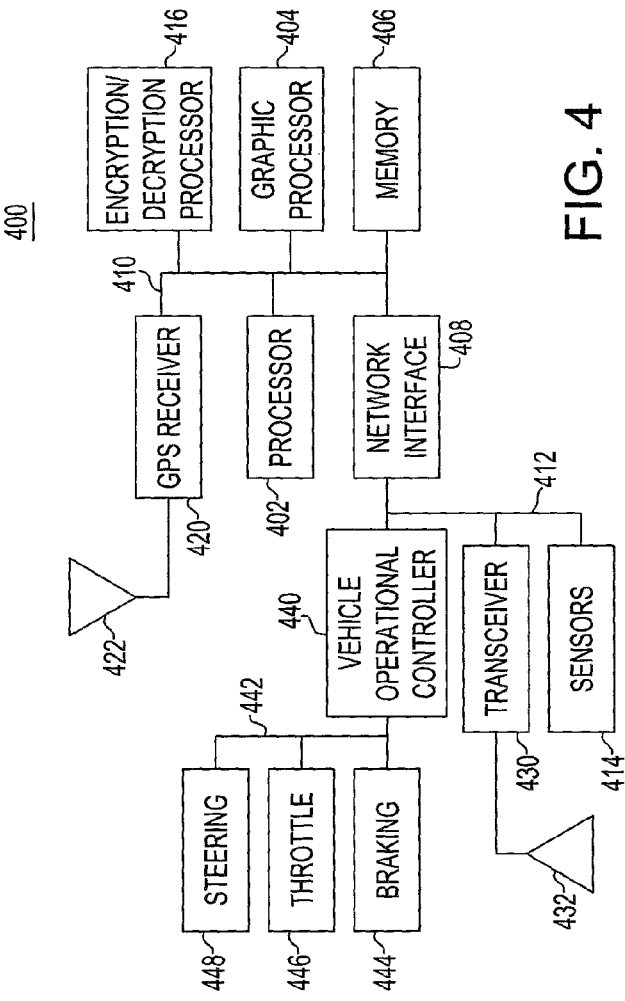
FIG. 4 is a block and schematic diagram illustrating elements of an autonomous vehicle piloting system in accordance with an embodiment of the invention.

FIG. 4 illustrates components of an exemplary implementation 400 of an autonomous piloting system in accordance with an embodiment of the 432 to and from transceivers of other vehicles and transceivers at other, possibly fixed, locations along a roadway on a path followed by the vehicle. As also illustrated in FIG. 4, a plurality of sensors 414 are connected to the second bus for communicating information acquired by the sensors back to processor 402. In a preferred implementation, the sensors 414 and processor 402 are elements which usable in implementing the function of the information acquisition system 120 (FIG. 1).

As further illustrated in FIG. 4, a vehicle operational controller 440 is connected to the network interface via bus 412 for receiving signals used to control the operation of the vehicle. Each of the systems for braking 444, throttle 446 and steering 448 is controllable automatically through electronic input. Each of these systems may also be controllable via electronic control signals, as well such as by hand pressure applied to a steering wheel, control stick or handle, by foot pressure applied to one or more pedals, or both. The vehicle operational controller 440 includes a control network 442 for communicating signals to each of corresponding control systems used to operate systems for braking 444, throttle 446, and steering 448 of the vehicle. The control network 442 may be capable of carrying signals from one or more of the braking, throttle and steering systems in a return direction towards the vehicle operational controller. The return direction signals can include, for example, information representative of outputs of sensors relating to the operation of the one or more of the braking 444, throttle 446 and steering 448 systems of the vehicle, for example. In this way, the return direction signals can contain information representative of one or more of the proper function or malfunction of the current operational state of the braking, throttle and steering systems. A malfunction occurring in any one of the braking, throttle and steering systems, to the extent determined through diagnosis using such return direction signals will be communicated to the processor 402 responsible for the overall control over the vehicle's operation to the extent that the malfunction is deemed to be true and is deemed actionable by the processor.

Although the control network 442 illustrated in FIG. 4 is shown having a bus topology, it is not necessary for the control network to have a bus topology. For example, the control network can include instead dedicated signal lines between the vehicle operational controller 440 and each of the braking, throttle and steering systems.

In an example of operation, the autonomous piloting system 100 relies upon information from multiple sources for estimating the position of the vehicle in which it is installed with respect to other vehicles and with respect to objects which can appear on or near the roadway. Specifically, from information obtained from sensors, e.g., cameras 12 (FIG. 2), mounted to the vehicle, the position determination system 110 (FIG. 1) determines the position of the vehicle relative to other vehicles or objects on or adjacent to the roadway. From a GPS receiver 420 (FIG. 4) on board the vehicle, the position determination system obtains an estimate of the position of the vehicle relative to universal coordinates, i.e., an estimate referenced to the latitude and longitude of the vehicle's position on the earth's surface. Other information concerning the GPS-determined positions of other vehicles relative to universal coordinates, and information relating to one or more of displacement, velocity and acceleration of such other vehicles relative to the one vehicle, or both types of position information can be received through an antenna 432 and transceiver 430 (FIG. 4) on the vehicle. This received information is communicated back to the position determination system 110 for further handling.

In an example of operation in accordance with one embodiment of the invention, the position determination system 110 of each vehicle, whenever possible, utilizes the information obtained through the vehicle's own information acquisition system 120 and information received from other vehicles to help determine the vehicle's own position relative to the coordinate space. As described above, the information acquisition system 120 of each vehicle uses GPS signals to determine the vehicle's position relative to universal coordinates. In a particular operation according to this embodiment of the invention, the position determination system 110 of the one vehicle uses the information received from other vehicles regarding estimates of these vehicles' own positions together with the one vehicle's estimates of the displacement between it and one or more other vehicles to calibrate operation of the vehicle's own GPS receiver.

An example of a wireless communication 500, e.g., a datagram, packet or other communication transmitted by the communication system 130 of each vehicle for reception by the communication systems of other vehicles is illustrated in FIG. 5. As illustrated in FIG. 5, the transmitted information signal 500 includes code information 510 used to identify communications between a transmitting vehicle and a receiving vehicle. Such code can be in form of a "session ID", for example, which identifies communications in both directions between the given pair of vehicles. Using such session ID, the communication systems 130 (FIG. 1) of each pair of communicating vehicles can determine quickly that they are already engaged in a communication "session", utilizing one-way or two-way communication between the vehicles to transmit information regarding one or both of the vehicles' positions. In addition, in this example, a transmitted information signal 500 includes a vehicle identifier, which may include the official vehicle identification number ("VIN") assigned to the vehicle at the time of manufacture. In addition, the information signal includes information regarding the position 530 and velocity 540 of the transmitting vehicle, as well as a time stamp 550 indicating the time at which the position information 530 and velocity information 540 were generated.

Desirably, the time stamp 550 should be at least twice as accurate and precise as the amount of time which corresponds to the maximum tolerable error for estimating the positions of the vehicles. For this purpose, the clock in each vehicle's piloting system desirably performs a synchronization routine at startup and at intervals thereafter to synchronize its clock relative to a universal clock reference, such as a reference clock signal received from GPS satellites, for example. Alternatively, clock synchronization can be performed by each vehicle's piloting system utilizing terrestrial transmitted clock reference signals, such as from transmitters co-located with base stations of cellular telephone systems.

The wireless transmission channel for carrying communications between vehicles can include a dedicated portion of the electromagnetic spectrum, or can utilize bandwidth which is shared with other types of communications. The transmitter on each vehicle may operate at low power levels similar to or lower than the power levels at which cellular telephones of currently promoted generations operate. Whether vehicles are stationary or moving, the movement of vehicles and the reflectivity of their metal surfaces, as well as weather conditions can make the transmission channel lossy. In a particular embodiment, the information signal transmitted by each vehicle may have a small bit length and be communicated frequently, even repetitively, to increase the chance that other vehicles successfully receive the information through the lossy transmission channel. To increase signal-to-noise ("SNR") ratio over such low power channel, communications may be modulated for transmission by a scheme such as code division multiple access ("CDMA"). Various ways of reducing bit length can be used. For example, instead of utilizing the unique vehicle identification number ("VIN") assigned to each vehicle at the time of manufacture as the vehicle identifier, to reduce bit length, the vehicle identifier 520 can instead be a number assigned dynamically at the beginning of each communication session between vehicles. In this case, the vehicle identifier need only be unique among the set of vehicles with which the one vehicle is currently in communication. In one such example, the vehicle identifier can be a number between 0 and 1023, for example, which can be encoded for transmission by ten bits, since $2^{10}$=1024. If a somewhat greater number of unique vehicle identifiers are required, only 16 bits are required to encode 64K (that is, 65,536) different vehicle identifiers, since $2^{16}$=65,536. If a still larger number of unique vehicle identifiers are required, it is noted that only twenty bits are needed to encode 1M (that is the number U.S. Pat. No. 1,048,576, i.e., roughly 1.05 million) different vehicle identifiers. These small bit counts needed to encode many combinations compare favorably to the bit counts required to transmit the actual vehicle identification numbers ("VIN numbers") imprinted on vehicles by the factory. Such VIN numbers typically contain twelve to twenty alphanumeric characters, and each alphanumeric character typically is encoded by a combination of eight bits. Thus, for a fifteen alphanumeric character VIN number, a total of 15×8=120 bits are needed to transmit the original VIN number, whereas only 16 bits are needed to encode and transmit a unique vehicle identifier from among 65,536 different possible combinations.

In a particular embodiment, the information signal can be transmitted with additional bits provided as an error detection code or error correction code ("ECC") to assure that an error in the information signal received from each vehicle is at least detected. The information signal may be transmitted with ECC bits sufficient for the receiving communication system 130 to correct an error in a single bit or a greater number of bits of the received signal.

As transmitted wirelessly between vehicles, the information signal 500 (FIG. 5) can be unencrypted or encrypted. Information signals may be encrypted to prevent the information therein regarding each vehicle from being received by unauthorized receivers. By preventing unauthorized reception, spoofing can be prevented. In the present context, spoofing means deliberately falsifying the identity of a transmitting source, e.g., one source masquerading as another, in order to perform some action that the one source may not have authority to perform. Preventing unauthorized reception can also avoid the collection of information by unauthorized users who might use the information for malicious purposes. Spoofing and other forms of malicious conduct can be reduced or eliminated by encrypting the information signal in the transmitting vehicle's piloting system 400 and decrypting the received encrypted signal at the receiving vehicle's piloting system 400. An encrypted information signal 500 can be encrypted by the transmitting vehicle prior to transmission through a program executed by the processor 402 or other processor (not shown) included in the autonomous piloting system 400. In a particular implementation, an encryption/decryption processor 416 may be used to encrypt the information signal 500 prior to transmitting the information signal via transceiver 430. In such implementation, the encryption/decryption processor 416 may also be used to decrypt encrypted information signals arriving at the vehicle's transceiver 430 through antenna 432 from other vehicles, for example.

FIG. 6 is a plan view looking towards a roadway 600 for illustrating operation of a vehicle which is equipped with an autonomous piloting system in accordance with an embodiment of the invention. Vehicles 10a, 10b, and 10c are shown traveling on a roadway 600, each traveling in the same direction indicated by arrows 602. Under steady-state "cruise" conditions the autonomous piloting system 100 of each vehicle maintains velocity constant or at a value which does not fluctuate rapidly with time. The autonomous piloting system 100 of each vehicle also maintains the position of such vehicle at a desirable location relative to edges 606 of the respective lane 604a, 604b, or 604c in which the vehicle travels, such that a desirable distance is maintained between each vehicle and the edge of the respective lane.

The autonomous piloting system 100 of a vehicle typically utilizes information from multiple sources to determine at what velocity the vehicle needs to be operated at each point in time and to generate corresponding control signals for controlling the braking 444, throttle 446 and steering 448 systems of the vehicle. As seen in the simplified view in FIG. 6, sensors including forward-facing sensors 12, such as stereoscopic imaging devices or other devices of a vehicle 10a capture information sufficient to determine the position of the vehicle 10a with respect to the roadway 600 and the edges 606 of the lane in which the vehicle 10a travels. In addition, the sensors of vehicle 10a, including sensors 12, determine the relative velocity between the vehicle 10a and another vehicle 10b in view of the sensors of that vehicle 10a. The information acquisition system 120 (FIG. 1), position determination system 110, routing system 140 and vehicle operating system 150 within the autonomous piloting system 100 of vehicle 10a uses this information acquired through sensors as primary information for controlling the direction and speed of movement of that vehicle 10a at each instant in time. The autonomous piloting system 100 of the vehicle also utilizes the sensor-obtained information to maintain a proper position and velocity for traveling on the roadway and to avoid possible collisions between the vehicle 10a and other vehicles or objects.

In addition to the information obtained by sensors of the vehicle 10a, the communication system portion 130 of autonomous piloting system 100 of vehicle 10a also receives and utilizes information signals communicated from autonomous piloting systems 100 of other vehicles 10b, 10c and autonomous piloting systems 100 of any other such equipped vehicles traveling on the roadway at the time. In this way, vehicle 10a receives an information signal 612 from a vehicle 10b adjacent to the vehicle 10a on the roadway, and receives an information signal 610 from another vehicle 10c on the roadway which is not quite as close to the first vehicle 10a as vehicle 10b. The information signals received at vehicle 10a contain the types of information illustrated in FIG. 5, for example. Local clocks in the autonomous piloting systems of each vehicle 10a, 10b and 10c are synchronized, desirably through synchronization with satellite-transmitted or terrestrially transmitted time reference signals received by each vehicle's GPS receiver 420 (FIG. 4). With synchronized local clocks, the time stamp 550 and vehicle identifier 520 (FIG. 5) of each received signal allow the position determination system 110 on the vehicle 10a to obtain, in a relatively error-free manner, the estimates of the position and velocity of other vehicles 10b and 10c made by those other vehicles. In addition, the position determination system 110 on vehicle 10a can obtain the estimates of the position and velocity of the one vehicle 10a which are made by one or more of the other vehicles 10b and 10c. Similar such information signals are transmitted from the autonomous piloting system 100 of vehicle 10a to the autonomous piloting systems 100 of the other vehicles 10b and 10c, for those vehicles to utilize as well.

With the received information from other moving vehicles on the roadway, the position determination system 110 (FIG. 1) of vehicle 10a obtains "collective intelligence" regarding its own position and velocity and the position and velocity of other vehicles on the roadway. In one example, the position determination system 110 of the one vehicle 10a applies such signals received from other vehicles together with the position and velocity information acquired by the vehicle's own information acquisition system 120 to an averaging system to obtain combined estimates of the position and velocity of the one vehicle 10a and to obtain combined estimates of the position and velocity of other vehicles 10b and 10c. In a particular example, averaging can be performed in a manner which is weighted by the distance from the particular vehicle which transmits the information signal at a given point in time. In this way, the obtained averaged estimates are likely to agree with the estimates obtained by each vehicle where vehicles are near each other.

Using the estimates of the one vehicle's position and velocity made by other vehicles with its own, over time the position determination system of the one vehicle 10a uses "collective intelligence" to obtain a "consensus estimate" of its own position and consensus estimates of other vehicles on the roadway. Over time, the position and velocity of each vehicle will appear the same or nearly the same to all vehicles which are near to each other on the roadway. In a particular embodiment of the invention, the position and velocity estimate transmitted by each vehicle to other vehicles reflects the "consensus estimates" for that vehicle that were obtained by considering the information acquired through the vehicle's information acquisition system and the estimates received from other vehicles.

In addition, the received information also permits the vehicle 10a to determine whether its autonomous piloting system 100 is functioning properly or not. One way for such function to be realized is to compare the estimates received from other vehicles regarding the position and velocity of that one vehicle 10a with the estimates made using information obtained through that one vehicle's own information acquisition system 120 (FIG. 1). If the estimates of position and velocity made by the one vehicle 10a are consistently far apart from the estimates of the one vehicle's position and velocity made by other vehicles on the roadway, the autonomous piloting system 100 of that one vehicle can make a judgment that there is a malfunction in that one vehicle's autonomous piloting system. Normal variations can be excluded from such comparisons by comparing the variation between the various vehicle's estimates of that one vehicle's position with a standard deviation value obtained by the collective intelligence. Specifically, the variation of that one vehicle's estimates can be compared relative to a standard deviation value, the standard deviation value being obtained by considering every vehicle's own estimate of its position and velocity relative to the estimates of position and velocity obtained by other vehicles for every such vehicle.

When a vehicle's autonomous piloting system determines that there is a malfunction in its operation, such as for example, in the above case when it deems that the estimates it makes of the vehicle's own position and velocity are error-prone, that vehicle's autonomous piloting system must act swiftly to ensure the safety of the vehicle's passengers. One possible response is for the autonomous piloting system of the vehicle to alert other vehicles of the problem and move the vehicle onto the shoulder of the road or other safe location and bring the vehicle to a halt. The autonomous piloting system can also alert the passenger of the problem and present an opportunity for the passenger to operate the vehicle as a driver upon proper authentication, e.g., through insertion of a key, use of a log-in procedure using alphanumeric or biometric (e.g., retina, fingerprint, etc.) authentication or both.

Another possible response of the autonomously piloted vehicle is to notify a receiving station of the problem and ask for assistance, e.g, via terrestrial or satellite communications. In such case, the receiving station can relay the problem vehicle's position and a description of the problem to an assistance center for help. The assistance center can then assign a trusted vehicle to help guide the problem vehicle back to a location where the vehicle can be repaired and the passenger can obtain alternate transportation. The trusted vehicle can then offer its help to the problem vehicle by allowing the problem vehicle to rely upon the positioning system and routing system of the trusted vehicle to get back to a safe location. Here, the problem vehicle need only be operational to the extent that its vehicle operating system 150 (FIG. 2) can follow the trusted vehicle at a constant distance during the time required for the trusted vehicle to ferry the problem vehicle to safety. The trusted vehicle can have different forms. In one form, the trusted vehicle can belong to a friend or relative who places the vehicle in a "trusted vehicle mode". In another form, the trusted vehicle can be a special vehicle designated for that purpose, such as one which belongs to a tow truck operator, who can also tow the vehicle if the problem disables the operational aspect of the vehicle. In another form, the trusted vehicle can be one designated by the owner, state or other operator of the roadway who operates such vehicles on the roadway according to a schedule, perhaps every 15 minutes to an hour for this purpose. In such case, the trusted vehicle can guide not merely one vehicle but trains of several vehicles which are not deemed sufficiently reliable for independent driverless control on the road.

Figure 7:
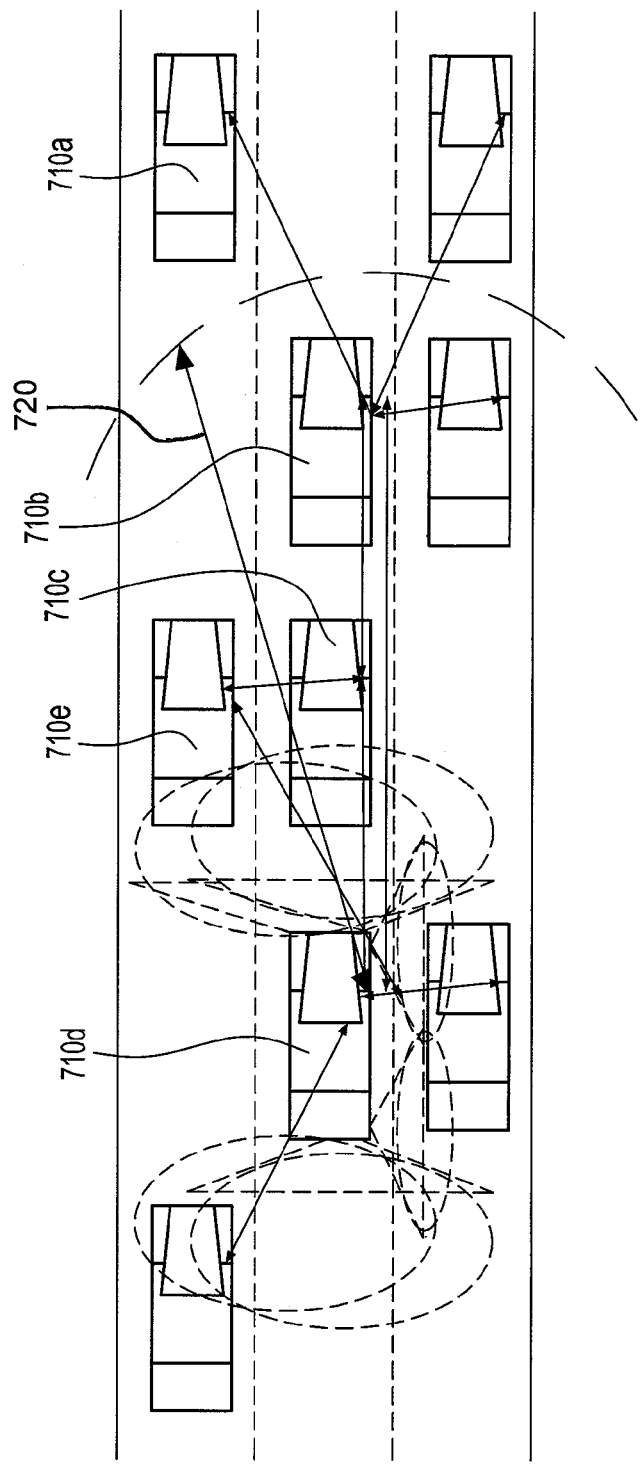
FIG. 7 is a diagram illustrating further operation of an autonomously piloted vehicle on a roadway in accordance with an embodiment of the invention.

The information transmitted between vehicles need not be limited to only estimates of the position and velocity of each vehicle that transmits the information. Instead, referring to FIG. 7, position and velocity estimates of vehicles can be transmitted from one vehicle to another in a "daisy-chained" manner. Stated another way, a particular vehicle (710a) transmits estimates of its position and velocity to another vehicle (710b) with which the particular transmitting vehicle has an active session, and then that vehicle 710b which receives the information retransmits the information on to other vehicles 710c and 710d with which that retransmitting vehicle (710b) has active sessions. This process can be repeated again by a receiving vehicle, e.g., vehicle 710d. Ultimately, a vehicle 710d receiving the information transmitted originally by many such vehicles obtains fairly complete information regarding many vehicles on the roadway.

Sometimes, with many vehicles on a roadway at one time, a vehicle may not need to consider estimates of the positions and velocities of other vehicles which are not relatively close to that vehicle (e.g., vehicle 710d) which receives the information. A certain "radius of potential interaction" 720 can be defined which encompasses all of the vehicles whose movement might normally be expected to influence the movement of the particular receiving vehicle. Outside of that radius, a vehicle 710d need not consider estimates of another vehicle's position and velocity. One result of using the radius of potential interaction is to reduce computational load on the autonomous piloting system of each vehicle in not needing to utilize information transmitted by vehicles which are too far from the current position of the receiving vehicle. Another result is that information which is retransmitted in daisy-chain manner from one vehicle to other nearby vehicles need not go on forever. Rather, when it is apparent from the position information contained in the information signal 500 received by one vehicle from another vehicle that the receiving vehicle is now beyond the radius of potential interaction, that information signal will not be retransmitted from that receiving vehicle on to other vehicles. Such operation can reduce the bandwidth needed to transmit all necessary information signals from each respective vehicle on the roadway to others.

As traffic, weather and visibility conditions on the roadway vary, the distance at which the radius of potential interaction is set can vary accordingly. Fog and snow are weather conditions for which the radius of potential interaction will be set larger than usual due to potentially greater difficulties in determining the positions and velocities of each vehicle in poor visibility, and the longer stopping distance required in lowered traction in case of snow.

In a particular example of operation, a vehicle's autonomous piloting system 100 (FIG. 2) executes a merge procedure to merge the vehicle into traffic flowing in a particular lane of a roadway. In such case, the routing system 140 (FIG. 2) of the vehicle's autonomous piloting system may determine headings and velocities at which to operate the vehicle at future points in time on a short range basis. For example, when the vehicle is currently traveling in one lane of a multi-lane highway and the one lane will soon disappear, requiring the vehicle to merge into traffic flowing in a different lane, the routing system determines a series of short range future headings and velocities at which to operate the vehicle in order to merge into the new lane. Here, the vehicle's own position relative to the roadway and to other nearby vehicles must be taken into account. In addition, the predicted positions and velocities of other vehicles in and near the position expected to be occupied by the one vehicle must be considered. The positions and velocities of the other vehicles must be predicted both for during and after the time required by the vehicle to execute a procedure to merge into the new lane. Here, the routing system 140 of the vehicle can autonomously determine a series of desired headings and velocities at different points in time to execute the merge procedure.

In conjunction with performing such merge procedure, the autonomous piloting system of the one vehicle that needs to merge can communicate its intent to do so to nearby vehicles on the roadway so that those other vehicles can make room for the merging vehicle. For example, the communication system 130 of the vehicle needing to merge can broadcast messages to other vehicles such as: "This vehicle needs to merge. This vehicle intends to occupy a position X at a point Y in time." Vehicles in a vicinity of the vehicle that needs to merge can determine from their own expected future positions whether the intended position and velocity of the merging vehicle will conflict with any of the expected future positions and velocities of such receiving vehicle. If there is no conflict, no message need be transmitted back to the vehicle that needs to merge. However, if a vehicle receiving the message determines that there is a conflict with that receiving vehicle's future expected position, future expected velocity or both, that receiving vehicle and the merging vehicle can then engage in arbitration to determine which vehicle should "win" the space. Typically, except under very heavy traffic conditions where traffic flow can be deliberately metered, a merging vehicle will have right of way once the merge procedure is initiated by that vehicle. Assigning right of way to a merging vehicle rather than a vehicle traveling already in a particular lane is the reverse of normal rules of the road. However, when a particular vehicle has already begun to execute a merge procedure, such reversal can lead to a better result. Given that the autonomously piloted vehicles are in communication with each other and other vehicles and are constantly determining their positions in relation to each other, the actions required of the merging vehicle to enter the merged lane can be more difficult to accomplish in a way that avoids disrupting the movement of other vehicles while assuring the safety of other vehicles than it is for the vehicle in the merged lane to adjust its position and velocity to accommodate the merging vehicle. However, if the vehicle that needs to execute the merge procedure has not yet initiated the procedure, it must not proceed in the face of communication from any other autonomously piloted vehicle which does not agree to give up the space. In a third possibility, the autonomous piloting systems of the two vehicles can decide a compromise solution in which each of the vehicles agrees to modify its own expected future position, velocity or both somewhat so that both vehicles can be accommodated in the merged lane.

One operation performed in accordance with a particular embodiment of the invention relates to communications relating to road hazards. Assume that a pothole, animal carcass, truck tire, rock, portion of tree, other debris, icy patch, puddle, oil spill, fuel spill, or the like has come to rest at particular point on a roadway, presenting a hazard to vehicles which may strike it, even if only the vehicle's tires strike the hazard. For safety and the ability to maintain a desired speed on the roadway, traveling onto or striking such road hazard 730 should be avoided by other vehicles. In this case, each vehicle on the roadway needs to receive advance warning concerning the road hazard 730 and needs to execute a safe coordinated evasive maneuver to avoid it. A first requirement is that the existence of the road hazard be communicated to other vehicles on the roadway. For this purpose, when a particular vehicle senses the presence of the road hazard and has not already received a communication identifying the road hazard's location and severity, that particular vehicle must utilize its communication system 130 to transmit information concerning the road hazard to a terrestrial or satellite-based traffic safety monitoring system, e.g., via over-the-air electromagnetic signaling (e.g., radio frequency, higher frequencies (shorter wavelengths) or light transmissions). Such vehicle can be referred to as an "encountering vehicle", of which there may be one or a plurality of vehicles which encounter the hazard prior to receiving communicated information regarding the hazard. Such encountering vehicle transmits information to other vehicles directly via the communication procedure described above with respect to FIG. 5, wherein the code 510, vehicle identifier 520 or other transmitted information field (not shown) can be used to identify a road hazard and a type of the hazard, e.g., such as whether the hazard is negotiable at a slower speed or must in all cases be avoided, and whether the hazard is limited to one lane or is spread out over the whole roadway, for example. Typically, the encountering vehicle broadcasts such communications regarding the hazard to all other vehicles with which it has sessions. Desirably, the encountering vehicle also broadcasts such communications regarding the hazard for reception by all other vehicles for a period of time sufficient for all vehicles within a given distance required for maneuvers to be warned. For example, the encountering vehicle may broadcast hazard communications to other vehicles for a period of thirty seconds. Assuming that each receiving vehicle is in a position to receive the communication from the encountering vehicle, this gives the communication systems 130 of the receiving vehicles a full one-half mile of travel at 60 miles per hour to receive the warning.

To the extent that the communication systems 130 of other vehicles on the roadway receive the communications originally from the encountering vehicle or through daisy-chained communications traced to the encountering vehicle, those other vehicles continue to retransmit the hazard communication within a radius of potential interaction designated for hazard communications. When discovery of the road hazard is still new and vehicle-to-vehicle communications are yet the only way that the hazard has been communicated, desirably, the radius of potential interaction is set to a large value for the hazard, such as, for example, one mile, two miles or a greater distance.

Once the traffic safety monitoring system receives a communication regarding the hazard from the encountering vehicle, it then transmits information regarding the road hazard to other vehicles traveling within a wider area which are approaching the road hazard. Once the traffic safety monitoring system begins these communications, it signals the encountering vehicle that such encountering vehicle can now stop transmitting the warning communication. The communications by the traffic safety monitoring system can be transmitted to vehicle directly via terrestrial-base stations, via satellite transmission, or via a combination of terrestrial and satellite transmissions, such as may include one or more terrestrial retransmissions when vehicles enter tunnels, narrow city passages and the like. In a particular embodiment, communications are desirably transmitted on a channel designated therefor, or alternatively, via a designated session between the communication system 130 on the vehicle and that of the terrestrial or satellite transmitter.

The traffic safety monitoring system desirably transmits the hazard-related communications for reception by all vehicles on the roadway whose positions are currently within some identified number of minutes (e.g., five to ten minutes or more) left to reach the road hazard. That way, the autonomous piloting systems of each vehicle have time to begin planning appropriate evasive maneuvers, to communicate their planned maneuvers to each other, determine and resolve any conflicts, and then execute the planned evasive maneuvers.

In a particular embodiment, the maneuver planned by each autonomously piloted vehicle in response to the road hazard is determined by the autonomously piloting system's reference to one or more rules for handling such event. In the case of needing to avoid a road hazard, for example, the rule may be one which requires vehicles approaching the hazard to shift position on the roadway to the next adjacent lane before reaching the hazard. In such case, the rule requires the autonomously piloted vehicles to individually avoid the road hazard in a way that can be described as each vehicle viewing the hazard-affected lane as being blocked ahead of the hazard by virtual traffic cones. The requirement for each vehicle to shift its lane position may not have to occur all at once, but may occur in a series of gradual steps or through a smooth gradual transition. After vehicles pass the location of the hazard defined in received communications, their autonomous piloting systems return use of the formerly affected lane to vehicles.

Figure 8:
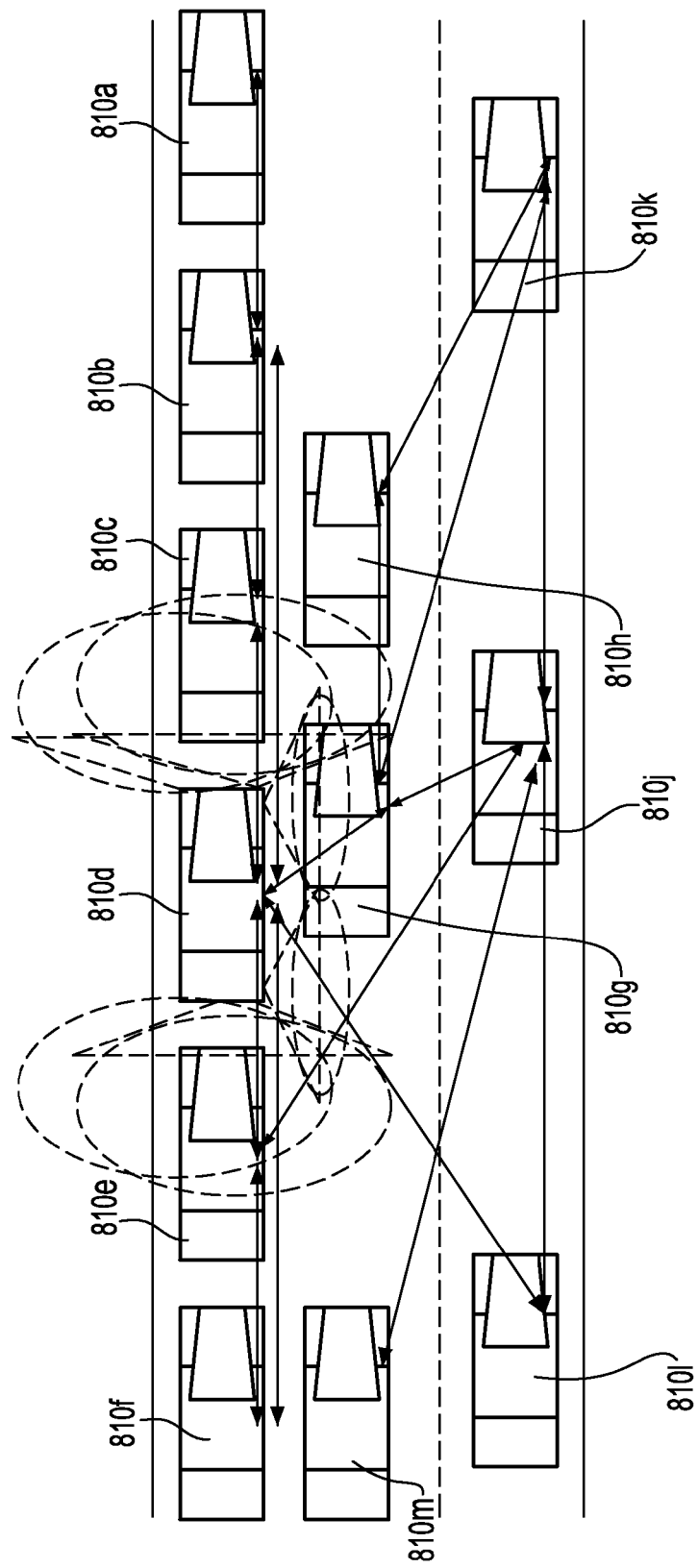
FIG. 8 is a diagram illustrating further operation of an autonomously piloted vehicle on a roadway in accordance with an embodiment of the invention.

Referring to FIG. 8, in a variation of the above-described embodiment, vehicles equipped with autonomous piloting systems are not required to maintain longitudinal and lateral distances between vehicles that human operators are accustomed to maintaining. Rather, using the above-described autonomous piloting systems, vehicles obtain information with sufficient accuracy, precision and rapidity to follow one another in a close formation and without having to maintain traditional lane-to-lane lateral spacing. As seen in FIG. 8, from sensors, e.g., stereoscopic cameras, or other sensors of a particular vehicle 810*d*, the autonomous piloting system of that vehicle acquires information for estimating the positions and velocities of vehicles 810*c*, 810*e*, 810*g* and 810*h* in its immediate vicinity. In addition, information regarding the positions and velocities of other vehicles is obtained through the communication system of that vehicle 810*d*, either directly from such other vehicles 810*b*, 810*c*, 820*e*, 810*f*, 810*l*, with which it has active sessions, or in a daisy-chained manner indirectly from other vehicles 810*a*, 810*h*, 810*j*, 810*k*, 810*m* with which vehicle 810*d* has no active session. By rapidly acquiring information regarding the position and velocity of each vehicle within the radius of potential interaction on the roadway, each vehicle's autonomous piloting system can control that one vehicle's own movement such that it remains in lockstep with the movement of other vehicles in a given formation. Vehicles enter and exit from a given formation by executing the above-described merge procedure, for example.

In the example illustrated in FIG. 8, three formations are apparent. In a first formation which includes vehicles 810*a*, 810*b*, 810*c*, 810*d*, 810*e* and 810*f*, vehicles follow one another closely at a constant velocity. This formation can be referred to as a "through traffic formation" because the vehicles therein are tightly packed in the formation and expected to remain therein for some time. These vehicles usually travel at or near the highest allowable speeds for the road but are packed more tightly than ordinary human-operated vehicles would be at that speed. Using autonomous piloting systems, each vehicle need not maintain a spacing equivalent to two seconds of travel from a vehicle ahead of such vehicle. For example, vehicles in such formation can travel at a speed of 65 miles per hour on an intercity highway, spacing between each of the autonomously piloted vehicles may be as little as one to two car lengths or less, much less than in human-operated vehicles. Such spacing is achievable through use of autonomous piloting systems because each autonomous piloting system continuously and rapidly receives and processes information regarding its position and velocity and other vehicle's positions and velocities. Essentially, "reaction time" of each autonomously piloted vehicle is much less than the traditional two seconds allotted for human operators to perceive a problem on the road and react effectively to the problem.

While the invention has been described in accordance with certain preferred embodiments thereof, many modifications and enhancements can be made thereto without departing from the true scope and spirit of the invention, which is limited only by the claims appended below.

What is claimed is:

1. A system for determining a position of a first vehicle during movement of the first vehicle, comprising:
    an information communication system configured to be transported by the first vehicle, the information communication system being operable to receive from at least one second vehicle an estimate of a position of the at least one second vehicle in relation to the first vehicle during movement of the first vehicle and the at least one second vehicle; and
    a position determining system configured to be transported by the first vehicle, the position determining system having (i) a plurality of sensors operable to obtain information relating to positions of each of a plurality of third vehicles and non-moving objects in a vicinity of the first vehicle during movement of the first and third vehicles, and (ii) a processor operable to determine a first estimate of a position of the first vehicle in relation to the third vehicles and non-moving objects from the information obtained by the plurality of sensors and from the received estimate of the position of the at least one second vehicle,
    wherein the sensors include a plurality of electronic cameras and the position determining system is operable to determine a displacement between the first vehicle and the plurality of third vehicles through processing of stereoscopic imaging obtained from the electronic cameras.

2. The system as claimed in claim 1, wherein the information is obtained via rays reflected off of the third vehicles and non-moving objects.

3. The system as claimed in claim 1, wherein the information communication system is operable to receive estimates of positions of a plurality of the second vehicles via vehicle position determining systems transported by the plurality of second vehicles.

4. The system as claimed in claim 3, wherein the estimates of the positions of the plurality of second vehicles are determined at least in part by sensors included in the vehicle position determining systems transported by the second vehicles.

5. The system as claimed in claim 4, wherein at least one of the estimates of the positions of the second vehicles is received at least once by a vehicle of the plurality of second vehicles, and is received by the first vehicle after retransmission by the vehicle of the plurality of second vehicles which received the at least one estimate.

6. The system as claimed in claim 1, wherein the position determining system of the first vehicle is operable to construct a view of a coordinate space over which the first vehicle is moving at a particular point in time and is operable to calibrate the view of the coordinate space using the received estimate of the position of the at least one second vehicle.

7. The system as claimed in claim 1, wherein the plurality of third vehicles includes the at least one second vehicle.

8. The system as claimed in claim 1, wherein the at least one second vehicle is a plurality of second vehicles and the position determining system is operable to obtain estimates of positions and velocities of the first vehicle and at least some of the second vehicles by weighted averaging, including assigning different weights to a plurality of estimates of position and velocity received from the plurality of the second vehicles, so as to assign a first weight to the position and velocity of a selected one of the plurality of second vehicles which is near the first vehicle, and assign a second weight, different from the first weight, to the position and velocity of a second one of the plurality of second vehicles farther away from the first vehicle than the selected vehicle.

* * * * *